United States Patent
Morrison

(10) Patent No.: US 6,871,971 B2
(45) Date of Patent: Mar. 29, 2005

(54) BACK-UP MIRROR SYSTEM FOR VEHICLE SAFETY WHEN BACKING INTO LANE(S) OF CROSS-TRAFFIC WITH BACK-UP MIRROR METHOD

(76) Inventor: William Lawrence Morrison, 1023 W. Crescent Ave., Park Ridge, IL (US) 60068

( * ) Notice: Subject to any disclaimer, the term of this patent is extended or adjusted under 35 U.S.C. 154(b) by 0 days.

(21) Appl. No.: 09/893,059

(22) Filed: Jun. 28, 2001

(65) Prior Publication Data

US 2003/0007263 A1 Jan. 9, 2003

(51) Int. Cl.[7] ............................ G02B 5/08; G02B 7/182
(52) U.S. Cl. ....................................... 359/850; 359/862
(58) Field of Search ............................... 359/857, 861, 359/862, 863, 844, 850; 248/467

(56) References Cited

U.S. PATENT DOCUMENTS

| | | | | |
|---|---|---|---|---|
| 1,338,738 A | * | 5/1920 | Kometter, Jr. ............... | 359/862 |
| 2,075,900 A | * | 4/1937 | Jackson ....................... | 359/862 |
| 2,398,354 A | * | 4/1946 | Brinkley ..................... | 359/857 |
| 3,704,063 A | * | 11/1972 | Guthrie ....................... | 359/863 |
| 3,809,461 A | * | 5/1974 | Baumgardner et al. ..... | 359/737 |
| 3,809,462 A | * | 5/1974 | Baumgardner et al. ..... | 359/726 |
| 4,687,305 A | * | 8/1987 | Harris, Jr. et al. .......... | 359/863 |
| 4,758,078 A | * | 7/1988 | Bracamonte ................ | 359/841 |
| 5,056,904 A | * | 10/1991 | Okamura ..................... | 359/841 |
| 5,566,030 A | * | 10/1996 | Yue .............................. | 359/872 |
| 5,576,898 A | * | 11/1996 | Rubin ......................... | 359/841 |
| 5,666,227 A | * | 9/1997 | Ben-Ghiath ................. | 359/630 |
| 2002/0186481 A1 | * | 12/2002 | Martinson ................... | 359/855 |

* cited by examiner

Primary Examiner—Mark A. Robinson

(57) ABSTRACT

A back-up mirror system for passenger vehicles allowing a driver to have an alternative view of any nearby oncoming cross-traffic imminently passing behind the vehicle before deciding to back up into that lane of cross-traffic, which is especially useful when an adjacent obstruction blocks direct views. The first mirror in the back-up mirror system is the standard rear-view mirror (10) generally positioned inside the passenger compartment at the top edge of the front windshield at the center of the vehicle's width and whose reflective surface is generally facing the rear window of the vehicle, and the second mirror, the back-up mirror (6), also mounted inside the passenger compartment, is mounted in a region behind the driver's seat, and whose reflective surface is generally facing a side of the vehicle (left-looking or right-looking). The back-up mirror system is especially useful when a backing-up driver has a limited range of neck movement preventing a direct look at oncoming cross-traffic. The back-up mirror method comprises the same back-up mirror (6), which provides an alternative view of any nearby oncoming cross-traffic for a driver backing up, which view is especially useful when direct views are blocked by an adjacent obstruction.

2 Claims, 3 Drawing Sheets

BACK-UP MIRROR SYSTEM FOR VEHICLE SAFETY WHEN BACKING INTO LANE(S) OF CROSS-TRAFFIC WITH BACK-UP MIRROR METHOD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The field of the present invention is an automobile safety improvement for aiding drivers of passenger vehicles driving in reverse.

When a driver of a parked passenger vehicle backs out of a parking space into a lane (or lanes) of cross-traffic, such as in a parking lot, the driver avoids collisions by looking for nearby oncoming cross-traffic before backing up. Views of the oncoming cross-traffic are frequently blocked when a large or tall vehicle is parked in an adjacent parking space, creating a safety problem. The frequency of such blockage has increased dramatically since the mid-1980's due to the popularity of taller passenger vehicles such as mini-vans and Sport Utility Vehicles (SUVs), while in prior years, an adjacent parked vehicle was frequently a sedan-type passenger vehicle whose trunk height was generally not higher than the driver's eye level.

Another safety problem arises during backing up when the direct, unaided, view towards oncoming cross-traffic lane(s) are beyond the peripheral vision of a driver's unaided eye, such as with drivers whose body has limited flexibility or limited range of motion in the neck and/or torso, and therefore cannot turn their head and/or torso far enough towards the rear of the vehicle when backing up to directly view the lane(s) of oncoming cross-traffic, such as is the case for many senior citizens.

While the use of a mirror or a mirror system for improving a driver's view of nearby traffic conditions is prolific in prior art, and familiar, with largely expected configurations, the problem of a driver's backing up their passenger vehicle, in reverse, without sufficient visibility of any nearby oncoming cross-traffic in lane(s) passing behind the vehicle has not been sufficiently addressed by prior art designs which were developed to fulfill other visibility objectives.

Prior to the present invention, drivers backing their passenger vehicle out of an obstructed-view parking space, garage, or fenced area must simply back out slowly enough for oncoming cross-traffic to respond in one of the following ways: a.) yielding to the backing-out vehicle, b.) honking to signal that the backing-up driver should stop backing-up, c.) swerving away from the backing-up vehicle while passing behind it, or d.) colliding with the backing-up vehicle. Auto Insurance Carriers have processed many tens of thousands of claims annually involving such backing collisions. The Motor Vehicle Crash Data from the GES (General Estimates System) and NHTSA (National Highway Traffic Safety Administration) of the U.S. Department of Transportation indicate that more than 120,757 backing collisions took place during 1992, while more than 216,000 backing collisions took place in 1999. Hundreds of driver-education courses include a unit on safety tactics for backing up, and several educational videos are currently for sale on the backing-up-safely issue. The 2001 California Driver Handbook of Safe Driving Practices instructs a driver to get out of the vehicle to look before backing up. This method doesn't solve the problem entirely because new oncoming cross-traffic could easily arrive during the 4 or 5 seconds that elapse while the driver gets back into the vehicle, fastens the seatbelt, and puts the transmission in reverse, and the driver would still have restricted visibility of that oncoming cross-traffic lane while seated in the driver's seat. Other driver training manuals offer their road-sense tip advising a driver to honk a warning tap on their horn if visibility is limited when starting to back up. This does not necessarily successfully alert the oncoming cross-traffic vehicle(s) of the imminent lane blockage, nor does it provide the backing-up driver with visibility of the oncoming cross-traffic lane(s) when seated in the driver's seat.

There are numerous electronic collision avoidance systems (CAS) in prior art which address regions outside the vehicle for detecting the presence of traffic in parallel lanes of travel (highway blind spot regions), or for detecting and warning of objects directly behind the vehicle's rear bumper. These systems, using radar, microwave, video camera, etc. technologies, draw power from on board their vehicle, constituting non-passive (active) methods of improving safety. The disadvantage of these designs is that they do not provide the driver with a view of the region(s) to the side of the rear bumper, namely where any nearby oncoming cross-traffic approaches to flow behind the vehicle which is about to back up, in a passive (non-powered) method. Further disadvantages are the difficulty of installing the numerous CAS components on previously-manufactured vehicles, the relatively expensive array of electronic components that comprise a CAS, and the complexity of assembling numerous electronic sensors and mechanical components to accomplish the detection and warning system, and the susceptibility to electronic component failure which leads to a less robust system life.

Some vehicles have a standard-equipment system which emanates a warning beeping tone which sounds repeatedly when the transmission is in reverse. This warning beep system does not provide a driver with better visibility of any nearby oncoming cross-traffic imminently passing behind the driver's vehicle, it merely attempts to warn oncoming cross-traffic of an imminent lane blockage.

Prolific prior art 'rear-view' and 'side-view' mirrors and mirror systems exist for providing information to a driver who is driving forwards, for example, U.S. Pat. No. 6,059,418 (2000) to Edwards. The present inventor has found no prior art mirror method or mirror system stating as its object the visibility of the nearby oncoming cross-traffic located in the lane(s) of cross-traffic passing behind their car when driving in reverse by use of a mirror or mirror system.

U.S. Pat. No. 2,075,900 (1937) to Jackson, "Parking Device", has a structure of elements which solves the problem of a backing-up driver whose own vehicle blocks the driver's direct view of whether the driver's own rear-bumper is aligned relative to the rear-bumper of a second vehicle located within 2 feet to the right of the driver's own vehicle, such as is encountered before backing into a vacant parallel-parking space on the driver's right-hand side. The structure of the Jackson parking mirror device requires the physical region located two feet to the right of the driver's own rear-bumper as an element. It also requires its reflective element aft of the driver to be fixed at the rear end of the driver's vehicle or inside a rear-facing windshield which is itself fixed at the rear end of the vehicle. The structure of Jackson also requires its rear reflecting element to be generally aimed somewhat downwards from horizontal. The disadvantage of the device of Jackson is that its structure fails to provide a seated driver with an image of the lane containing oncoming cross-traffic objects which are still 3 to 40 feet away but will soon cross behind the driver's vehicle.

A further problem which has not been found to be addressed by prior art is that many drivers have relatively limited mobility or bodily-flexibility for turning their head, neck, and/or torso far enough towards the rear of their vehicle to adequately face the rear window to successfully look in the direction(s) of the oncoming cross-traffic lane(s) before backing up. Such a driver's peripheral vision is often insufficient for directly viewing those nearby regions of oncoming cross-traffic lanes, regardless of whether a view-blocking obstruction is adjacent to their vehicle or not. There appears to be no prior art which claims as its objective to aid such a limited-flexibility driver with a passive (non-powered) method of viewing the aforementioned lane(s) for any oncoming cross-traffic before backing up.

It can therefore be appreciated that there exists an unsolved need for a passive system and/or method which improves visibility and safety before backing up into a lane(s) of cross-traffic by affording a driver an alternative view of the lane(s) of oncoming cross-traffic containing nearby traffic which is not yet directly behind the vehicle, yet imminently will be. The present system and method substantially departs from the designs and solutions found in prior art, and, despite its great advantages, has not been previously implemented by those skilled in the art.

BRIEF SUMMARY OF THE INVENTION

In accordance with the present invention a back-up mirror system comprised of two mirrors: a rear-view mirror located in the usual position generally in front of the driver and mounted near the center of the front windshield edge, in combination with a second mirror, the back-up mirror, located in a position generally aft of the driver's seat, whose reflective surface is generally facing towards one side of the vehicle (left-looking or right-looking).

Together, the two mirrors provide a driver with a back-up mirror system affording an alternative view of any nearby oncoming traffic in the lane(s) of cross-traffic. The detailed description and drawings more fully describe the features of this present invention and some of its several embodiments.

Accordingly, besides the objects and advantages described above of the present invention, several other back-up mirror system objects and advantages are:

(a) To provide a driver with an alternative view of the nearby traffic in lane(s) of cross-traffic passing behind the vehicle before backing up, especially when an adjacent view-blocking obstruction is present;

(b) To allow a driver to see the alternative view without turning their head and eyes towards the rear window(s);

(c) To provide this utility with a passive system (drawing no power from on-board energy sources during viewing);

(d) To provide this utility while the driver is seated in the driver's seat;

(e) To provide this utility via an automotive aftermarket safety accessory which is easily and readily mounted in existing passenger vehicles;

(f) To not substantially obstruct any of the views already available to a driver through the window at the rear of the passenger compartment while in the driver's seat of their vehicle;

(g) To have a mounting method which permits easy adjustment of the mirror angle to accommodate the relative locations of a driver's eyes, the vehicle's height, the shape of it's rear window(s) and side windows, and the nearby traffic in cross-traffic lane(s) generally to a side of the rear of the vehicle, and the two mirrors, yet require no re-adjustment for successive uses by the same driver, and be easily re-adjustable for accommodating a different driver height for a different driver of the same vehicle;

(h) To be relatively inexpensive yet effective in accomplishing the intended purposes;

(i) To be readily incorporated into the design and manufacture of new passenger vehicles as original equipment;

(j) To be simple in construction with relatively few parts while accomplishing the intended objectives.

(k) To be relatively robust, with a relatively long functional life of service.

Further objects and advantages of my invention will become apparent from a consideration of the drawings and detailed description.

BRIEF DESCRIPTION OF THE SEVERAL VIEWS OF THE DRAWINGS

The present invention will be better understood with the following detailed description and drawings.

REFERENCE NUMERALS IN DRAWINGS

Figure 1:
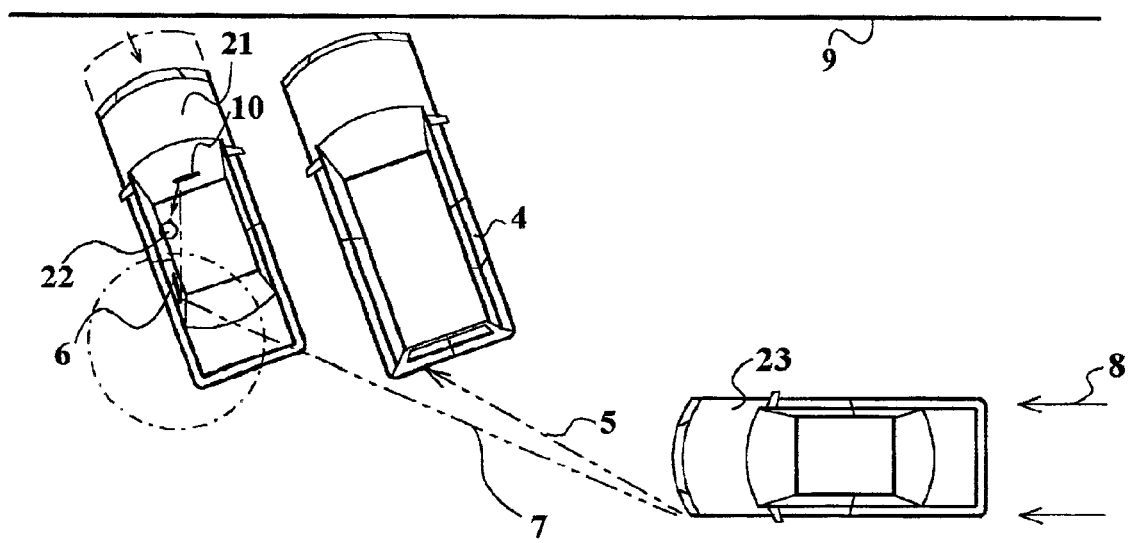
FIG. 1 is a plan view of a passenger motor vehicle having side doors starting to back up from an angled parking space without direct visibility of nearby oncoming cross-traffic which is approaching from the vehicle's passenger-side, showing a preferred embodiment of the present invention, a back-up mirror system, wherein a driver looks forward into a rear-view mirror for an image of a (right-looking) back-up mirror's image of any nearby oncoming cross-traffic.
Figure 1:
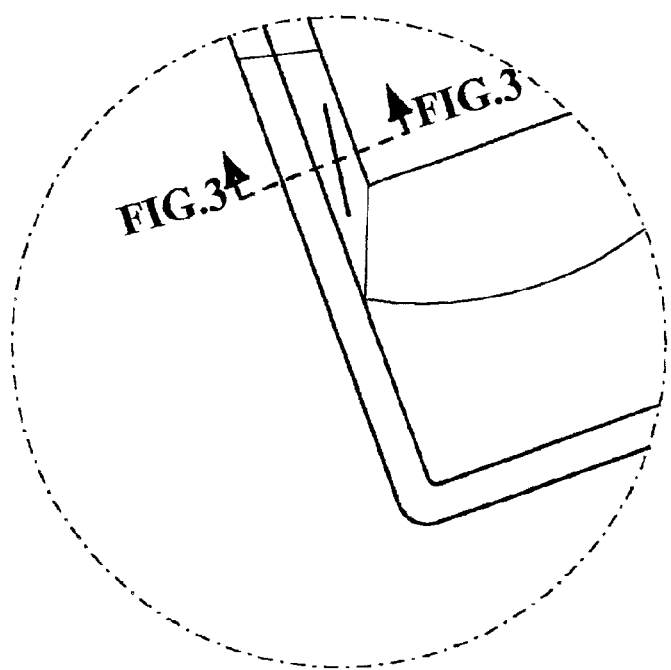

21 Vehicle with an embodiment of Back-up Mirror System 22 Driver of vehicle 21 23 Nearby oncoming cross-traffic 4 Adjacent view-blocking obstruction, e.g. a parked mini-van 5 Blocked light rays 6 Back-up Mirror (such as Saf-T-Sight(.TM.), See-Around(.TM.) back-up mirror, mark applied for by M. M. O'Leary) 7 light rays traveling from 23 to 22 8 A lane of cross-traffic crossing behind 21 9 Curb 10 Rear-view mirror with mounting method 11 Housing 12 Vehicle interior surface, nearly vertical 13 Mounting/fastening method 14 Ball element 15 Socket element 16 Support

DESCRIPTION

FIGS. 1–3

A preferred embodiment of the present invention is illustrated in FIG. 1. This figure illustrates a back-up mirror system allowing an alternative view of nearby oncoming cross-traffic approaching from the right side (passenger-side) of a backing-up vehicle. The back-up mirror system is shown in a passenger motor vehicle 21 which has a conventional right side (passenger-side), left side (driver's-side), side doors, front end, rear end, rear-bumper, passenger compartment, rear window, and nearly vertical side pillars which support conventional, non-moving side or rear windows. A driver 22 is facing forward. Vehicle 21 is equipped with a standard rear-view mirror 10 whose reflecting surface lies in a nearly vertical plane, which plane is also nearly parallel with the vehicle's rear-bumper, in which a specially-positioned back-up mirror 6 can be seen by driver 22, as can light rays 7 emanating from oncoming cross-traffic vehicle 23. Vehicle 21, parked in an angled parking space, is backing away from curb 9. A lane of cross-traffic 8 flows behind vehicle 21, containing oncoming cross-traffic 23 approaching from the vehicle's passenger-side. Vehicle 21 is parked to the right of lane 8. Driver 22 does not have a direct view of a nearby oncoming vehicle 23 because the direct view is obstructed and blocked by an adjacent obstruction 4, a parked mini-van, parked alongside the passenger-side of vehicle 21, as indicated by blocked light rays 5 emanating from vehicle 23, since light is unable to pass through the obstruction. The rear-bumper of the parked mini-van 4 is not visible to driver 22 via back-up mirror 6 due to the opaque body materials of vehicle 21 blocking the path of rays traveling from the mini-van's rear-bumper upwards towards back-up mirror 6. The back-up mirror 6 in this embodiment is mounted against a non-door, nearly-vertical, non-movable vehicle surface inside the passenger compartment, on the driver's-side of the car, near the rear of the passenger compartment, well aft of the driver's-seat row, but well forward of the vehicle's rear-bumper. The back-up mirror 6's reflecting surface lies in plane which is nearly vertical, and the plane is also very nearly parallel with the vehicle's sides, as shown in the encircled detail in FIG 1.

Figure 2:
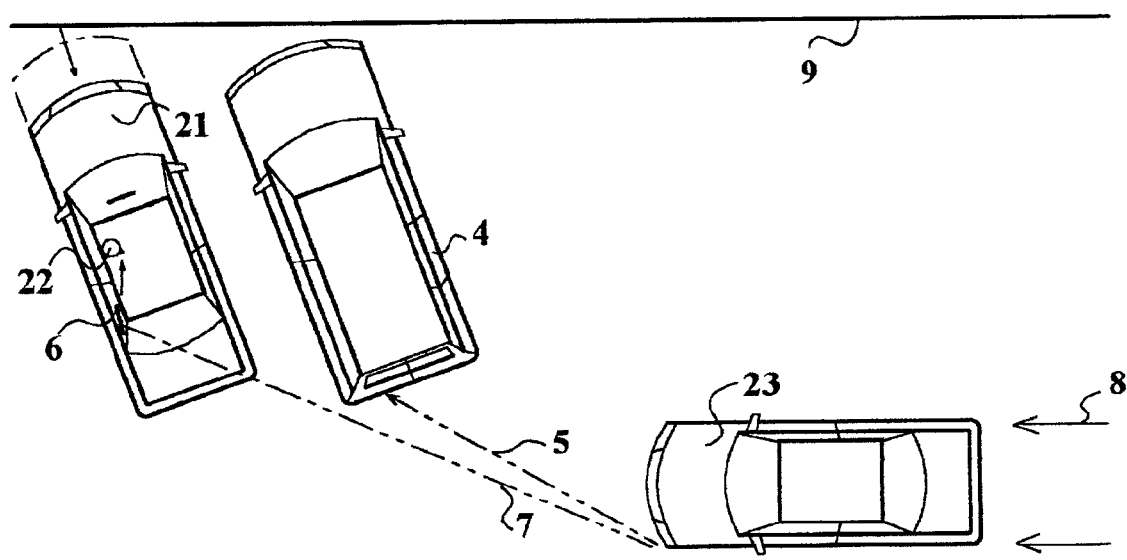
FIG. 2 is the same as FIG. 1, but shows a second usage of the present invention, a back-up mirror method, wherein the driver turns to face the rear of the vehicle to directly view the image in the same (right-looking) back-up mirror as shown in FIG. 1 to see the presence or absence of any nearby oncoming cross-traffic.
Figure 3:
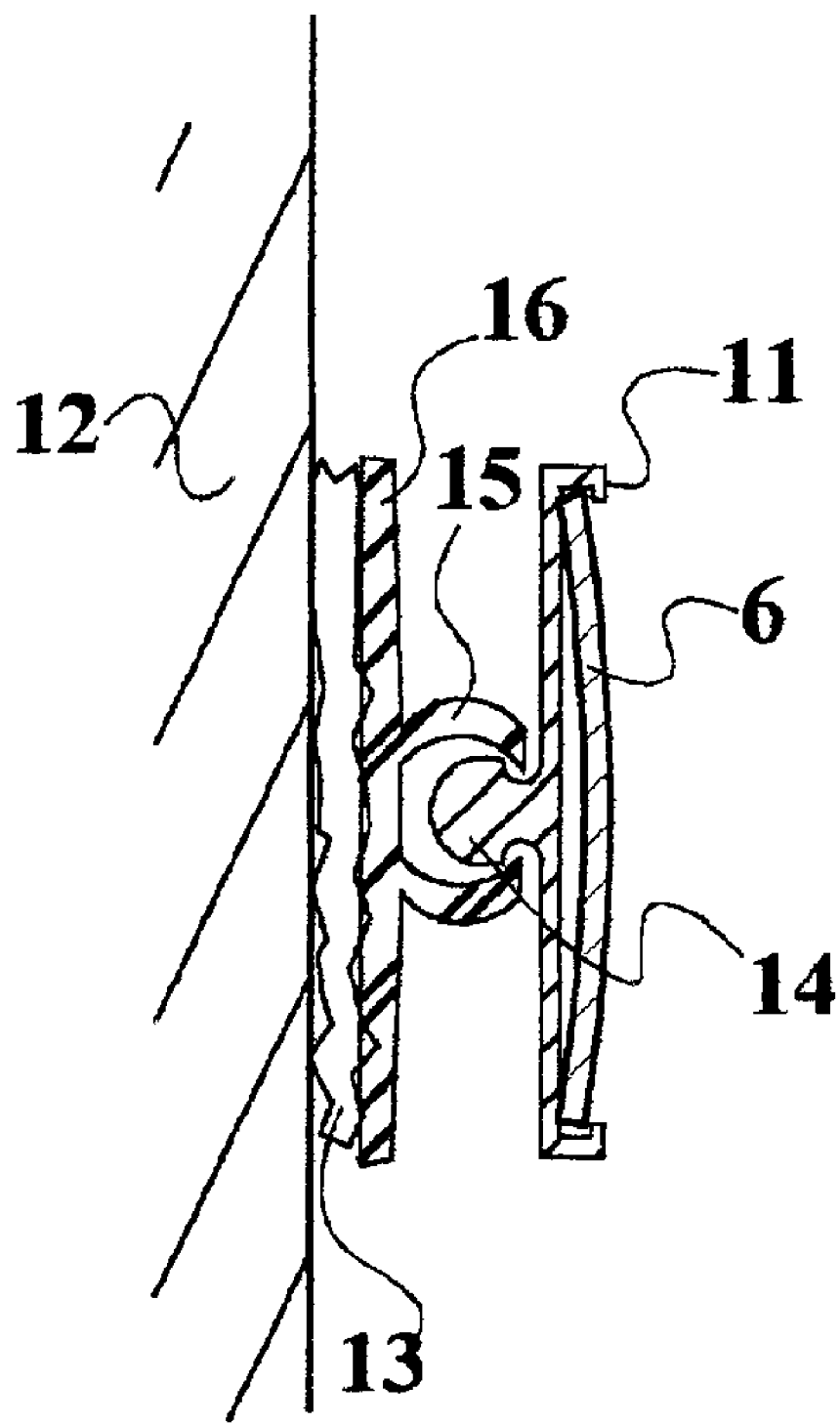
FIG. 3 is a section view of a preferred embodiment of a back-up mirror with suitable mounting method for mounting to a passenger vehicle as an automotive aftermarket safety accessory.

Additional embodiments are shown in FIG. 2 and FIG. 3.

FIG. 2 is a plan view of a passenger motor vehicle 21 equipped with an identical preferred embodiment of a back-up mirror system as FIG. 1, but driver 22's head is partially turned to substantially turn their eyes towards the rear window of vehicle 21. Driver 22 is backing away from curb 9 out of the angled parking space into the lane of cross-traffic. The adjacent obstruction 4 blocks the path of light rays 5 emanating from nearby oncoming cross-traffic 23. Light rays 7 emanating from cross-traffic 23 are visible by driver 22 via the alternative view seen in back-up mirror 6.

FIG. 3 is a section view of an embodiment of a back-up mirror 6 with a mounting method. This embodiment is intended to be applied to a vehicle as an automotive aftermarket safety-accessory, optionally used in conjunction with the existing rear-view mirror found in previously-manufactured passenger vehicles. In this embodiment, mirror 6 is held by a housing 11 which has a ball element 14 which mates to a socket element 15 which is an integral feature of a mirror support 16. Embodiments of the mounting method such as this one provide a small range of mirror-angle adjustment in 1, 2 or 3 axes (pitch, roll, or yaw) for a driver to accommodate the relative positions of several objects: the driver's head, the rear window(s) of the vehicle, the position of a nearby oncoming vehicle in the lane of cross-traffic, the mounting location of rear-view mirror 10, and the mounting location of back-up mirror 6. In this embodiment, mirror support 16 is mounted by a suitable method 13 (pressure sensitive adhesive, screws, pop-rivets, suction cup, etc.) to a non-door, nearly vertical surface 12 inside the passenger compartment of the vehicle.

DETAILED DESCRIPTION OF THE INVENTION

Operation of the Invention: The manner of usage is mostly apparent from the above description of FIG. 1, wherein driver 22 begins slowly backing away from curb 9, and after checking for traffic directly behind vehicle 21 by glancing out the rear window of vehicle 21 or glancing into rear-view mirror 10, looks into rear-view mirror 10 to see an image of back-up mirror 6's image of any nearby oncoming cross-traffic 23 traveling in lane of cross traffic 8, indicated by light rays 7 emanating from cross-traffic 23, in other words light rays 7 reflect from back-up mirror 6 into rear-view mirror 10 and reflecting into the driver's eyes; which view is available without driver 22 having to turn their head, eyes, and/or torso towards the rear end of vehicle 21. Driver 22 decides whether it is safe to proceed with backing up into lane of cross-traffic 8. The embodiment in FIG. 1 illustrates a right-looking back-up mirror 6 mounted in a position on the inside of the passenger compartment along the driver's side of vehicle 21 by suitable method against a non-door, nearly-vertical, non-movable surface, well aft of the driver's-seat row, but well forward of the vehicle's rear end, enough forward so that a ray emanating from the rear-bumper of adjacent parked obstruction 4 towards the back-up mirror 6 cannot reach back-up mirror 6 due to the opaque materials of vehicle 21. During backing up, the rear-view mirror 10 is aimed at the same direction as when it is used without the presence of the back-up mirror 6, namely, the driver also sees an image of the rear window(s) in the rear-view mirror. In this embodiment driver 22 need only adjust the angle of back-up mirror 6 once, and not again on successive re-use. In some experimental embodiments mounted on smaller passenger vehicles, a very small leftward leaning of the driver's body or head is sometimes needed to keep the driver's head out of the line of sight between rear view mirror 10 and back-up mirror 6. Meanwhile, direct visibility by driver 22 of any nearby oncoming cross-traffic 23 is blocked by adjacent obstruction 4, the neighboring parked mini-van, as indicated by blocked rays 5.

The manner of usage for an embodiment of a back-up mirror method shown in FIG. 2 is for driver 22 of vehicle 21 to begin backing away from curb 9, but before entering the lane of cross-traffic 8 which flows behind vehicle 21, turns their head and eyes generally towards vehicle 21's rear window to see an image of any nearby oncoming cross-traffic 23 via back-up mirror 6 as indicated by light rays 7. Meanwhile, direct visibility of nearby oncoming cross-traffic 23 is blocked by adjacent obstruction 4, the parked mini-van, as indicated by blocked rays 5.

Thus the reader will see that the present invention provides a driver with a system and a method for seeing an alternative view of nearby oncoming cross-traffic when backing up near obstructions which otherwise block the driver's direct view, to assist in avoiding collisions when backing up. The system provides a driver with an alternative view without requiring the driver to turn their head and eyes to face the rear window. The present back-up mirror system augments a vehicle operator's vision when backing up and the present back-up mirror method augments a vehicle operator's vision when backing up.

The above description should not be construed as limiting the scope of the present invention, but merely provide an illustration of some of the presently preferred embodiments thereof. Many variations are possible, for example:

The present invention also applies to a left-looking back-up mirror system and left-looking back-up mirror method whose back-up mirror is mounted inside the passenger compartment, well aft of the driver's-seat row, against a nearly-vertical, non-door, non-movable vehicle-surface, along the passenger-side of the vehicle, well forward of the vehicle's rear-bumper, whose reflecting surface is generally facing the left side (driver's-side) of the vehicle, thus providing a left-looking alternative view of any nearby oncoming cross-traffic approaching from the left side and imminently passing behind the vehicle, a view which might otherwise be blocked by an adjacent obstruction parked alongside the driver's-side of vehicle 21, an embodiment being useful in instances where the driver is backing up from a parking space which lies to the left of the lane of traffic 8;

another embodiment is for the mounting position of a back-up mirror to be on a side-window's inside surface such as found on SUVs having narrow side pillars and/or non-movable side windows;

More variations are possible:

The back-up mirror could be a plane mirror, or slightly convex (R>>0), or be a combination of these or other mirror types (aspherical, cylindrical, etc);

the back-up mirror's mounting angles could be remotely re-adjustable via motorized method, similar to the power-side-view-mirror adjustment systems found on current luxury passenger vehicles;

the surface area of the mirror(s) could be a variety of sizes larger than 10 cm$^2$, of rectangular, oval, or other shapes;

the mirror element could be made with a variety of materials and/or substrates which produce its reflective surface;

the back-up mirror could be mounted onto a remotely manipulated device which keeps the mirror folded away until the moment it is needed, then the mirror is raised or opened for use, then retracted again, such as by a sliding or pivoting mounting method, with or without spring-loaded action;

the back-up mirror could be an automotive aftermarket accessory sold separately from the vehicle or be an original-equipment feature included in a newly-manufactured vehicle; or the back-up mirror could be mounted permanently at a fixed, non-adjustable angle relative to the vehicle.

The scope of the present invention should not be limited by the embodiments and ramifications herein described, but encompasses any and all embodiments within the true spirit and scope of the following claims and their legal equivalents and such equivalent constructions which do not depart from the scope of the following claims.

What is claimed and desired to be secured by Letters of Patent of United States is:

1. A back-up mirror system to improve safety when a driver begins driving a passenger vehicle in reverse into a lane of cross-traffic, comprising:

(a) a passenger vehicle, including a driver's side and a passenger side, said sides include doors, a rear bumper fixed at the rear end of said vehicle, a passenger compartment, a driver'seat, a window at the rear of said passenger compartment, and (b) a rear-view mirror consisting of a single optical element physically positioned with mounting means inside said passenger compartment in a location generally in front of said driver's seat row, said rear-view mirror's reflecting surface generally lying in substantially vertical plane and which reflecting surface faces generally toward the aft of said vehicle lying in a plane substantially parallel with said rear bumper, and (c) a back-up mirror consisting of a single optical element physically positioned with mounting means inside said passenger compartment at a location aft of said driver's seat row, said location also lying enough forward of said rear end so that a ray emanating from a rear bumper of an adjacent obstruction(4) towards said back-up mirror position is blocked by said vehicle(21) itself, said location also generally against a non-door surface of said passenger compartment's driver's side, said back-up mirror's reflecting surface lying in a substantially vertical plane, and which plane is also generally parallel with said vehicle's sides, all of whose relative physical locations and reflecting relationships form a physical structure wherein an image of a nearby oncoming cross-traffic object approaching from said passenger side and traveling in a lane of cross-traffic crossing behind said vehicle arrives at said driver's seat region via said rear-view mirror's image of said back-up mirror's image, whereby a driver sees a view of said nearby oncoming cross-traffic object, which information is needed at the moment of deciding the safety of driving said vehicle in reverse into said lane of cross-traffic, whereby a collision can be better avoided, whereby the back-up mirror element does not substantially obstruct existing rear-views through said window at the rear of said passenger compartment.

2. A back-up mirror system to improve safety when a driver begins driving a passenger vehicle in reverse into a lane of cross-traffic, comprising:

(a) a passenger vehicle, including a driver's side and a passenger side, said sides include doors, a rear bumper fixed at the rear end of said vehicle, a passenger compartment, a driver's seat, a window at the rear of said passenger compartment, and (b) a rear-view mirror consisting of a single optical element physically positioned with mounting means inside said passenger compartment in a location generally in front of said driver's seat row, said rear-view mirror's reflecting surface generally lying in a substantially vertical plane and which reflecting surface faces generally toward the aft of said vehicle lying in a plane substantially parallel with said rear bumper, and (c) a back-up mirror consisting of a single optical element physically positioned with mounting means inside said passenger compartment at a location aft of said driver's seat row, said location also lying enough forward of said rear end so that a ray emanating from a rear bumper of an adjacent obstruction(4) parked alongside the drivers's-side of said vehicle toward said back-up mirror position is blocked by said vehicle(21) itself, said location also generally against a non-door surface of said passenger compartment's passenger side, said back-up mirror's reflecting surface lying in a substantially vertical plane, and which plane is also generally parallel with said vehicle's sides, all of whose relative physical locations and reflecting relationships form a physical structure wherein an image of a nearby oncoming cross-traffic object approaching from said driver's side and traveling in a lane of cross-traffic crossing behind said vehicle arrives at said driver's seat region via said rear-view mirror's image of said back-up mirror's image, whereby a driver sees a view of said nearby oncoming cross-traffic object, which information is needed at the moment of deciding the safety of driving said vehicle in reverse into said lane of cross-traffic, whereby a collision can be better avoided, whereby the back-up mirror element does not substantially obstruct existing rear-views through said window at the rear of said passenger compartment.

* * * * *